(12) United States Patent
Tsai et al.

(10) Patent No.: US 11,343,541 B2
(45) Date of Patent: May 24, 2022

(54) SIGNALING FOR ILLUMINATION COMPENSATION

(71) Applicant: MEDIATEK INC., Hsinchu (TW)

(72) Inventors: Chia-Ming Tsai, Hsinchu (TW);
Chun-Chia Chen, Hsinchu (TW);
Chih-Wei Hsu, Hsinchu (TW);
Ching-Yeh Chen, Hsinchu (TW);
Tzu-Der Chuang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/051,269

(22) PCT Filed: Apr. 29, 2019

(86) PCT No.: PCT/CN2019/085043
§ 371 (c)(1),
(2) Date: Oct. 28, 2020

(87) PCT Pub. No.: WO2019/210829
PCT Pub. Date: Nov. 7, 2019

(65) Prior Publication Data
US 2021/0051345 A1 Feb. 18, 2021

Related U.S. Application Data

(60) Provisional application No. 62/785,713, filed on Dec. 28, 2018, provisional application No. 62/664,387, filed on Apr. 30, 2018.

(51) Int. Cl.
*H04N 19/52* (2014.01)
*H04N 19/85* (2014.01)
(Continued)

(52) U.S. Cl.
CPC .......... *H04N 19/85* (2014.11); *H04N 19/139* (2014.11); *H04N 19/159* (2014.11);
(Continued)

(58) Field of Classification Search
None
See application file for complete search history.

(56) References Cited

U.S. PATENT DOCUMENTS 8,774,282 B2 7/2014 Song
8,891,608 B2 * 11/2014 Lin .................. H04N 19/52
375/240

(Continued)

FOREIGN PATENT DOCUMENTS

CN 101193302 A 6/2008
CN 105393534 A 3/2016
(Continued)

OTHER PUBLICATIONS

B. Choi, J. Han, C. Kim and S. Ko, "Motion-Compensated Frame Interpolation Using Bilateral Motion Estimation and Adaptive Overlapped Block Motion Compensation," in IEEE Transactions on Circuits and Systems for Video Technology, vol. 17, No. 4, pp. 407-416, Apr. 2007, doi: 10.1109/TCSVT.2007.893835.*

(Continued)

*Primary Examiner* — Mohammad J Rahman
(74) *Attorney, Agent, or Firm* — McClure, Qualey & Rodack, LLP

(57) ABSTRACT

A video coder that implements illumination compensation is provided. The video coder receives a first block of pixels in a first video picture to be coded as a current block, wherein the current block is associated with a motion vector that references a second block of pixels in a second video picture as a reference block. The video coder performs inter-prediction for the current block by using the motion vector to (Continued)

generate a set of motion-compensated pixels for the current block. The video coder modifies the set of motion-compensated pixels of the current block by applying a linear model that is computed based on neighboring samples of the reference block and of the current block. The neighboring samples are identified based on a position of the current block within a larger block.

20 Claims, 10 Drawing Sheets

(51) Int. Cl.
    *H04N 19/96*     (2014.01)
    *H04N 19/139*     (2014.01)
    *H04N 19/159*     (2014.01)
    *H04N 19/176*     (2014.01)
    *H04N 19/117*     (2014.01)

(52) U.S. Cl.
    CPC ........... *H04N 19/176* (2014.11); *H04N 19/52* (2014.11); *H04N 19/96* (2014.11); *H04N 19/117* (2014.11)

(56) References Cited

U.S. PATENT DOCUMENTS

| | | |
|---|---|---|
| 10,200,688 B2 | 2/2019 | Ikai |
| 10,477,231 B2 | 11/2019 | Lim et al. |
| 10,880,570 B2 * | 12/2020 | Chuang ................ H04N 19/198 |
| 2008/0170629 A1 | 7/2008 | Shim et al. |
| 2009/0323798 A1 * | 12/2009 | He ....................... H04N 19/513 375/240.01 |
| 2011/0110429 A1 * | 5/2011 | La ........................... H04N 19/50 375/240.16 |
| 2012/0027097 A1 * | 2/2012 | Lin ....................... H04N 19/513 375/240.16 |
| 2015/0326881 A1 | 11/2015 | Ikai et al. |
| 2016/0335752 A1 * | 11/2016 | Lim ........................ G06T 7/246 |
| 2016/0366415 A1 * | 12/2016 | Liu ....................... H04N 19/119 |
| 2017/0150186 A1 * | 5/2017 | Zhang .................. H04N 19/625 |
| 2018/0098079 A1 * | 4/2018 | Chuang ................. H04N 19/51 |
| 2018/0176592 A1 * | 6/2018 | Lim ...................... H04N 19/186 |
| 2018/0192072 A1 * | 7/2018 | Chen ................... H04N 19/513 |
| 2018/0262773 A1 * | 9/2018 | Chuang ................. H04N 19/20 |
| 2020/0177911 A1 * | 6/2020 | Aono .................... H04N 19/139 |

FOREIGN PATENT DOCUMENTS

| | | |
|---|---|---|
| CN | 107710764 A | 2/2018 |
| CN | 107810635 A | 3/2018 |

OTHER PUBLICATIONS

International Search Report and Written Opinion dated Jun. 27, 2019, issued in application No. PCT/CN2019/085043.

Chinese language office action dated Jul. 9, 2020, issued in application No. TW 108115036.

* cited by examiner

SIGNALING FOR ILLUMINATION COMPENSATION

CROSS REFERENCE TO RELATED PATENT APPLICATION(S)

The present disclosure is part of a non-provisional application that claims the priority benefit of U.S. Provisional Patent Application No. 62/664,387, filed on 30 Apr. 2018, and U.S. Provisional Patent Application No. 62/785,713, filed on 28 Dec. 2018. Contents of above-listed application(s) are herein incorporated by reference.

TECHNICAL FIELD

The present disclosure relates generally to video processing. In particular, the present disclosure relates to signaling of illumination compensation.

BACKGROUND

Unless otherwise indicated herein, approaches described in this section are not prior art to the claims listed below and are not admitted as prior art by inclusion in this section.

High-Efficiency Video Coding (HEVC) is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. While intra prediction modes use the spatial neighboring reconstructed pixels to generate the directional predictors, inter prediction modes use the temporal reconstructed reference frames to generate motion-compensated predictors. After the prediction is performed and the predictors are subtracted from the source block, the residual blocks are further transformed and quantized in transform units (TU) and then coded into bitstream. The more accurate predictors can be generated, the smaller residual blocks will be obtained, and the higher compression ratio can be achieved.

Inter predictions explores the correlations of pixels between frames and can be efficient if the scene are stationary and motion estimation can find similar blocks with similar pixel values in the temporal neighboring frames. However, frames are captured in different lighting conditions. The pixel values between frames may be different even if the content is similar and the scene is stationary.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provides a video coder that implements illumination compensation. The video coder receives a first block of pixels in a first video picture to be coded as a current block, wherein the current block is associated with a motion vector that references a second block of pixels in a second video picture as a reference block. The video coder performs inter-prediction for the current block by using the motion vector to generate a set of motion-compensated pixels for the current block. The video coder modifies the set of motion-compensated pixels of the current block by applying a linear model that is computed based on neighboring samples of the reference block and of the current block. The neighboring samples are identified based on a position of the current block within a larger block. In some embodiments, the video coder determines whether to enable illumination compensation mode based on a prediction setting of the current block, and the video coder modifies the current block by applying a linear model when the illumination compensation mode is enabled.

In some embodiments, the illumination compensation mode may be disabled if the current block is not a top-most block or a left-most block of the larger block or CTU. In some embodiments, the illumination compensation mode is turned off when General Bi-prediction (GBi), Bi-directional optical flow (BIO), Sub-PU Temporal Motion Vector Prediction (SPTMVP or ATMVP), Affine mode, Bilateral Template MV Refinement (DMVR), Multi-hypothesis Intra-Merge mode, Multi-hypothesis Merge mode, or Multi-hypothesis Merge+AMVP mode is turned on for the current block.

In some embodiments, the neighboring samples are identified based on a position of the current block within a larger block. The linear model is based on a set of illumination compensation parameters comprising a scaling factor and an offset for a linear model. The larger block may include multiple sub-blocks and the current block is a first sub-block. Neighboring pixels of the first sub-block are used as neighboring samples to compute the linear model that is used to modify the current block and other sub-blocks of the larger block. In some embodiments, neighboring pixels of the larger block are sub-sampled and used as the neighboring samples to compute the linear model that is used to modify the current block and other sub-blocks of the larger block.

In some embodiments, the current block may be a CU in a CTU that includes multiple CUs. The identified neighboring samples of the current block are derived based on neighboring pixels of the CTU. In some embodiments, the current block is a prediction unit (PU) and the larger block is a coding unit (CU) that includes a plurality of PUs and has a size that is greater than a threshold. The identified neighboring samples of the current block are derived based on neighboring pixels of the CU.

In some embodiments, the identified neighboring samples of the current block are neighboring pixels of the larger block that are vertically or horizontally aligned with the current block. The neighboring samples may include neighboring pixels above the larger block and no other pixels when the current block is at a top edge of the larger block but not at a left edge of the larger block. The neighboring samples may include neighboring pixels left of the larger block and no other pixels when the current block is at a left edge of the larger block but not at a top edge of the larger block.

In some embodiments, the neighboring samples are computed by using reconstructed pixels of a neighboring block based on prediction pixels and residual pixels when the residual pixels are available and by using the prediction pixels of the neighboring block when the residual pixels are not available. In some embodiments, the linear model is inherited from a neighboring block of the current block.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Some embodiments of the disclosure provide a video coder that may implement an illumination compensation mode. Specifically, when encoding or decoding a block of pixels as a current block of pixels to be coded, the video coder may apply a linear model (based on a set of illumination compensation parameters) to inter-predicted (or motion-compensated) pixel values of the current block when the illumination compensation mode is enabled. The linear model is applied to each pixel position of the current block to compensate for changes that are not due to motion, e.g., changes in lighting conditions.

In some embodiments, the video coder receives a first block of pixels in a first video picture to be coded as a current block. The current block is associated with a motion vector that references a second block of pixels in a second video picture as a reference block. The video coder performs inter-prediction for the current block by using the motion vector to generate a set of motion-compensated pixels for the current block. The video encoder may enable or disable illumination compensation mode for the current block based on a particular set of conditions. When illumination compensation is enabled, the video coder may provide a linear model or a set of illumination compensation parameters for the current block and use the linear model or the set of illumination compensation parameters to modify the set of motion-compensated pixels of the current block. The linear model may be computed based on neighboring samples that are identified for the current block and the reference block.

Figure 1:
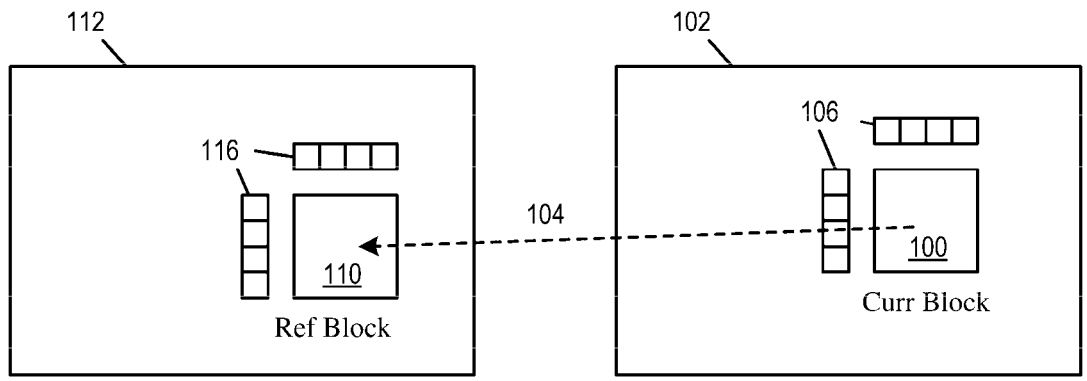
FIG. 1 conceptually illustrates illumination compensation mode according to some embodiments of the disclosure.
Figure 1:
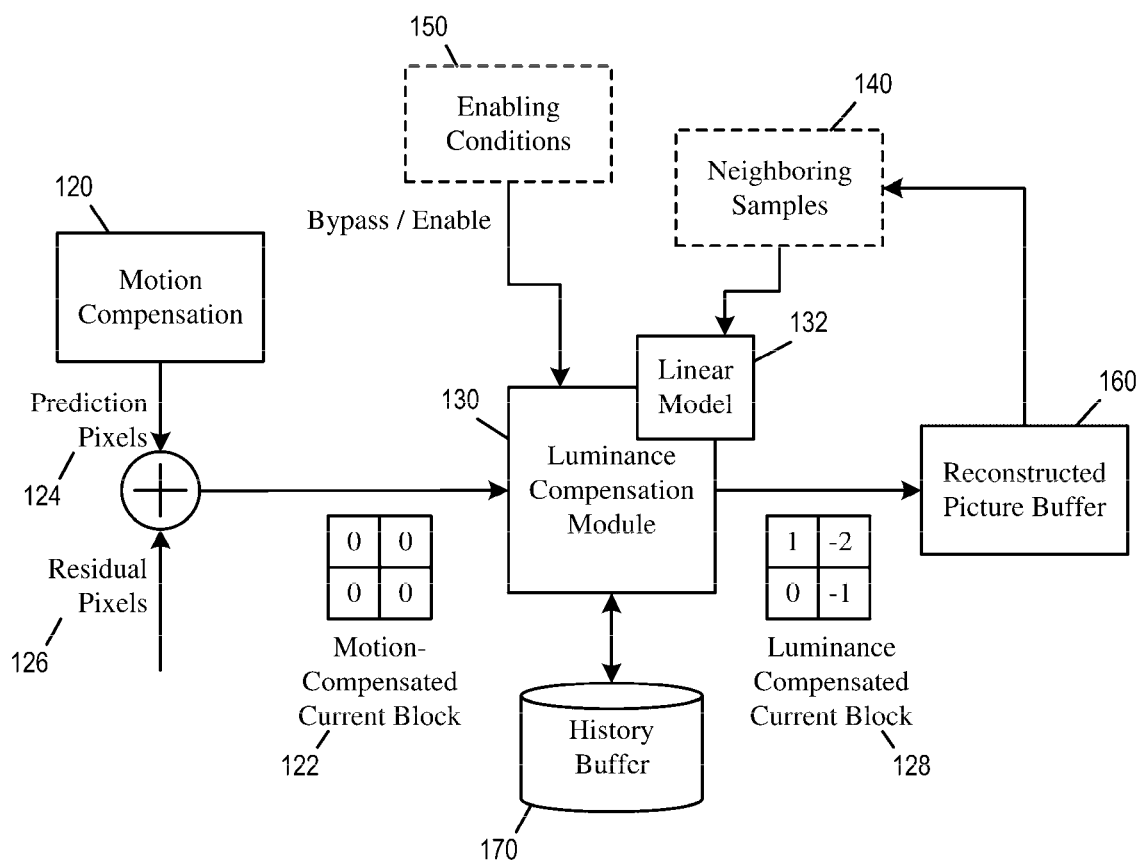

FIG. 1 conceptually illustrates illumination compensation mode according to some embodiments of the disclosure. The figure illustrates a block of pixels 100 that is the current block being coded by a video coder. The current block 100 is in a first video picture 102. The current block 100 is associated with a motion vector 104. The motion vector 104 references a set of pixels 110 as a reference block in a second video picture 112.

Based on the motion vector 104, a motion compensation module 120 of the video coder performs inter prediction to produce a set of prediction pixels 124 for the current block. The set of prediction pixels 124 is added with a set of residual pixels 126 to generate a set of reconstructed pixels 122 for the current block 100.

The video coder includes an illumination compensation module 130 that may apply a linear model 132 to modify the pixel values of the motion-compensated current block 122. The linear model 132 may be characterized by a scaling factor and an offset. The illumination compensation may modify the pixel value at each pixel position of the motion-compensated current block 122 according to the linear model 132. The modified pixels of the current block 128, or the luminance compensated current block 128, are stored in the reconstructed picture buffer 160 to be displayed or to be referenced by subsequent blocks and/or video pictures. In some embodiments, the illumination compensation modifies the pixel values of the motion-compensated current block 122 by applying the linear model 132 to refine the prediction pixels 124.

The linear model 132 may be derived dynamically based on the neighboring samples 106 of the current block and neighboring samples 116 of the reference block. Neighboring samples of a block generally refer to pixel samples of a L-shape regions (or L-shape template) that are near the top of the block and near the left of the block. Video coders in different embodiments may use pixels in different positions relative to the current block as neighboring samples (in other words, different L-shape regions) when determining the linear model for illumination compensation. In some embodiments, the neighboring samples of a block are taken from pixels immediately to the top and left of the block. In some embodiments, the current block is a sub-block of a larger block or a CU of a CTU, and the neighboring samples are taken from the neighboring pixels of the larger block or the CTU rather than from the immediate neighboring pixels of the current block.

In some embodiments, the pixels in the L-shape template of the current block and the L-shape template of the reference block are sub-sampled into a particular size. After the sub-sampling, the weighting factor and offset factor of the linear model can be calculated by the sub-sampled L-shape.

The video coder may use the reconstructed pixels of a neighboring block as neighboring samples to compute the linear model. The video coder may use only the prediction pixels of the neighboring block as neighboring samples to compute the linear model if the residual pixels of the neighboring block are not yet available.

Instead of having to compute the linear model 132 based on the neighboring samples, the current block 100 may also inherit its linear model 132 from a neighboring block, e.g., the neighboring block providing the selected merge candidate during merge mode. The current block may also retrieve a previously used linear model from a history buffer 170.

The video coder may or may not perform illumination compensation for the current block. If the illumination compensation is disabled or bypassed for the current block, the video coder may not compute the linear model for the current block and may not modify the motion-compensated pixels of the current block based on the linear model.

The video coder may enable or disable illumination compensation based on one or more enabling conditions 150. These enabling conditions 150 may include the size of the current block, the position of the current block within a larger block (e.g., the position of the current CU in a CTU), or the configuration settings of other operations related to the current block, e.g., General Bi-prediction (GBi), Bi-directional optical flow (BIO), Sub-PU Temporal Motion Vector Prediction (SPTMVP or ATMVP), Affine mode, Bilateral Template MV Refinement (DMVR), Multi-hypothesis Intra-Merge mode, Multi-hypothesis Merge mode, Multi-hypothesis Merge+AMVP mode, etc. The current block may also inherit its illumination compensation settings, including whether to enable illumination compensation mode, from a neighboring block during merge mode. In some embodiments, the video coder may infer the configuration settings of other operations based on the settings of the illumination compensation mode.

Video coders in different embodiments may use different types of illumination compensation modes, which may use different linear models or different methods of modifying the current block to compensate for illumination changes. Examples of illumination compensation modes include: Neighboring-derived Prediction Offset (NPO), whose linear model applies an offset to each pixel position of the current block; and Local Illumination compensation (LIC), whose linear model applies a scaling factor and an offset to each pixel value of the current block.

I. Neighboring-Derived Prediction Offset (NPO)

Neighboring-derived Prediction Offset (NPO) is used to add prediction offset to improve the motion-compensated predictors. With this offset, the different lighting conditions between frames can be considered. The offset is derived using neighboring reconstructed pixels (NRP) and extended motion-compensated predictors (EMCP). The NRP is the neighboring samples of the current block. The EMCP is the neighboring samples of the reference block.

In some embodiments, the patterns chosen for NRP and EMCP are N pixels left and M pixels above to the current block and the reference block, respectively, where N and M is a predetermined value. The patterns can be of any size and shape and can be decided according to any encoding parameters, such as PU or CU sizes, as long as they are the same for both NRP and EMCP. Then the offset is calculated as the average pixel value of NRP minus the average pixel value of EMCP. This derived offset will be unique over the PU and applied to the whole PU along with the motion-compensated predictors.

Figure 2:
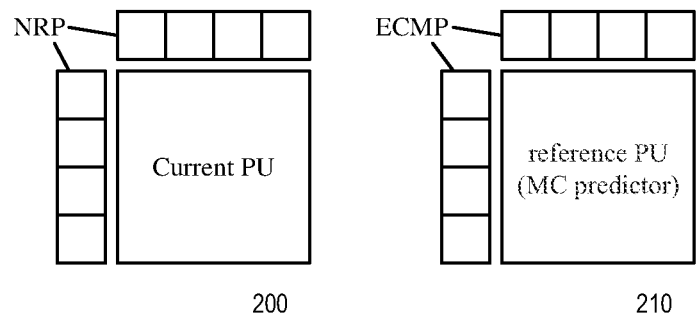
FIG. 2 illustrates deriving NPO offsets for different pixel positions for a Prediction Unit (PU) as the current block.

FIG. 2 illustrates deriving NPO offsets for different pixel positions for a PU 200 as the current block. For each neighboring position (shaded regions left of and above the boundaries of the current block 200), the individual offset is calculated as the corresponding pixel in NRP (neighboring pixels of the current block 200) minus the corresponding pixel in EMCP (neighboring pixels of a reference PU 210). In the example, the offset values are 6, 4, 2, −2 for the above neighboring positions and 6, 6, 6, 6 for the left neighboring positions.

Based on the offset values of the above and left neighboring positions, the offset positions of individual positions of the current block are calculated. Specifically, the derived offset for each position in the current block 200 is calculated as the average of the offsets from the left and above positions. For example, for the left-most position in the top row, offset of 6 is generated by averaging the offset from left (6) and above (6). For the second left-most position in the top row, the offset of 5 is calculated as the average of the offset from the left (6) and above (4). The offset for each position can be processed and generated in raster scan order sequentially. Since the neighboring pixels are more highly correlated to the boundary pixels, so do the offsets. In some embodiments, the offset values are adaptive according to the pixel positions. The derived offsets are adaptive over the PU and applied to each PU position individually along with the motion-compensated predictors.

II. Local Illumination Compensation (LIC)

Local Illumination Compensation (LIC) is a method of inter prediction that uses neighbor samples of the current block and neighbor samples of a reference block to derive a linear model that includes a scaling factor a and an offset b. LIC is enabled or disabled adaptively for each CU.

When LIC is applied to a block, a least square error method is employed to derive the parameters a and b by using the neighboring samples of the current block and their corresponding reference samples in a reference picture (i.e., neighboring samples of the reference block). In some embodiments, subsampled (e.g., 2:1 subsampling) neighboring samples of the CU and the corresponding pixels (identified by motion information of the current CU or sub-CU) in the reference picture are used to derive the parameters a and b. The LIC parameters are derived and applied for each prediction direction separately.

When a CU is coded with 2N×2N merge mode, the LIC flag is copied from neighboring blocks, in a way similar to motion information copy in merge mode; otherwise, an LIC flag is signaled for the CU to indicate whether LIC applies or not. In some embodiments, when LIC is enabled for a picture, additional CU level rate-distortion (RD) check is performed to determine whether LIC is applied or not for a CU.

When LIC is enabled for a CU, mean-removed sum of absolute difference (MR-SAD) and mean-removed sum of absolute Hadamard-transformed difference (MR-SATD) may be used for integer pel motion search and fractional pel motion search, respectively. In some embodiments, SAD and SATD are used for integer pel motion search and fractional pel motion search, respectively.

In some embodiments, LIC is disabled for the entire picture when there is no obvious illumination change between a current picture and its reference pictures. Histograms of a current picture and every reference picture of the current picture may be calculated at the encoder to identify this situation. If the histogram difference between the current picture and every reference picture of the current picture is smaller than a given threshold, LIC is disabled for the current picture; otherwise, LIC is enabled for the current picture.

III. Position Constraint

In some embodiments, the current block may be a sub-block of a larger block that contains multiple sub-blocks. The current block may also be a CU in a larger CTU that contains multiple CUs. The current block may also be a Video Processing and Distribution Unit (VPDU) inside a large CU that includes multiple VPDUs.

In some embodiments, the video coder may use a position constraint for determining whether to enable or disable illumination compensation mode (e.g., LIC, NPO) for the current block. Namely, if the position of the current block within the larger block satisfies the constraint, illumination compensation mode is turned on, otherwise, it is turned off. In some embodiments, illumination compensation mode is turned on when the current CU is at the topmost position inside the current CTU. In some embodiments, illumination compensation mode is turned on when the current CU is at the leftmost position inside current CTU. In some embodiments, illumination compensation mode is turned on when the current CU is on the leftmost position and/or on the topmost position. In some embodiments, when the current block fails the position constraint, the illumination compensation mode is turned off implicitly and that the video encoder does not signal on/off syntax for illumination compensation mode.

Combined with the position constraint, the L-shape template from which the neighboring samples are taken may drop a vertical part or a horizontal part. For example, if the current CU is a leftmost CU of the current CTU but not a topmost CU of the current CTU (e.g., the starting X coordinate of the CU is equal to starting X coordinate of the current CTU coordinate x but the starting Y coordinate of the current CU is not equal to the starting Y coordinate of the current CTU coordinate), the L-shape region from which the neighboring samples are taken may include only the vertical part but not the horizontal part. Conversely, if the current CU is a topmost CU of the current CTU but not a leftmost CU of the current CTU, the L-shape region from which the neighboring samples are taken may include only the horizontal part but not the vertical part. In some embodiments, the reconstructed samples from the CTU row above the current CTU are available in the CTU row buffer for the current pipeline stage. Thus, using top or left neighboring pixels of the CTU as neighboring samples to compute the linear model for the current CU may reduce the latency.

Figure 3A:
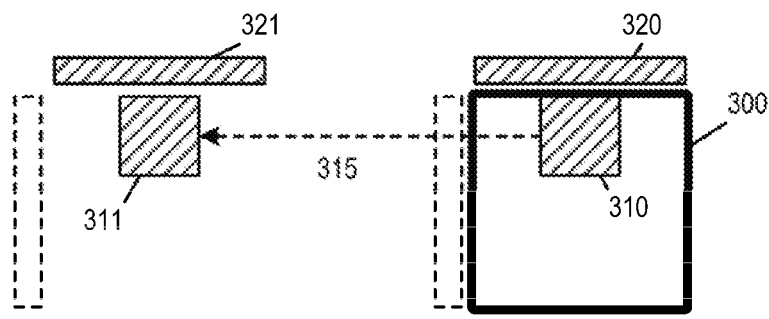
FIG. 3a illustrates illumination compensation mode for a current block that is a top-most sub-block of a larger block.

FIG. 3a illustrates illumination compensation mode for a current block that is a top-most sub-block of a larger block. Specifically, the figure illustrates a CU 310 that is in a CTU 300. The CU 310 is a top-most CU of the CTU 300. However, the CU 310 is not a left-most CU of the CTU 300.

The illumination compensation mode is turned on for the CU 310, since the top edge of the CU 310 touches the top edge of the CTU 300. However, the neighboring samples used to compute the linear model for the illumination compensation mode includes only the horizontal part of the L-shape, illustrated as region 320. The region 320 does not include pixels neighboring the left edge of the CTU 300 or the CU 310. The CU 310 has a corresponding reference block 311 identified by a MV 315. When computing the linear model for the CU 310, only the neighboring samples in a region 321 to the top of the reference block 311 is used. Samples to the left of the reference block 311 are not used.

Figure 3B:
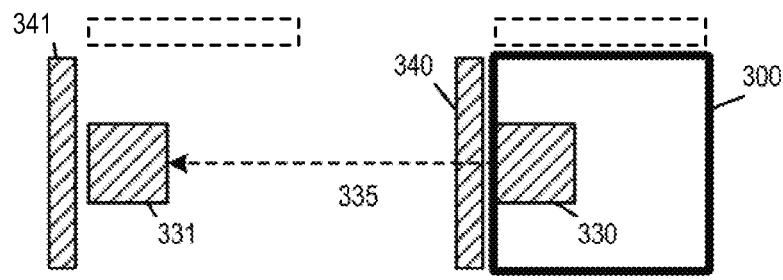
FIG. 3b illustrates illumination compensation mode for a current block that is a left-most sub-block of a larger block.

FIG. 3b illustrates illumination compensation mode for a current block that is a left-most sub-block of a larger block. Specifically, the figure illustrates a CU 330 that is in a CTU 300. The CU 330 is a left-most CU of the CTU 300. However, the CU 330 is not a top-most CU of the CTU 300.

The illumination compensation mode is turned on for the CU 330, since the left edge of the CU 330 touches the left edge of the CTU 300. However, the neighboring samples used to compute the linear model for the illumination compensation mode includes only the vertical part of the L-shape, illustrated as region 340. The region 340 does not include pixels neighboring the top edge of the CTU 300 or the CU 330. The CU 330 has a corresponding reference block 331 identified by a MV 335. When computing the linear model for the CU 330, only the neighboring samples in a region 341 to the left of the reference block 331 is used. Samples above the reference block 331 are not used.

In some embodiments, for illumination compensation mode of a current block, the L-shape template from which the neighboring samples are taken may be outside of the larger block that includes the current block. The neighboring samples may be neighboring pixels of the CTU that are vertically or horizontally aligned with the CU.

Figure 4:
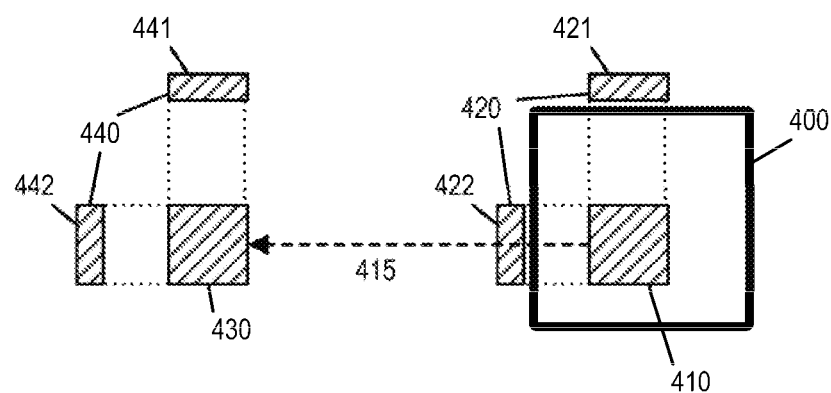
FIG. 4 illustrates neighboring samples for a current CU that are taken from outside of the current CTU.

FIG. 4 illustrates neighboring samples for a current CU that are taken from outside of the current CTU. In the example, illumination compensation mode is performed for a current CU 410 within a CTU 400. The neighboring samples for the current CU 410 for the illumination compensation mode are taken from a "modified" L-shape region 420, which includes a horizontal part 421 and a vertical part 422. The horizontal part 421 of the L-shape is just outside the current CTU 400 with its horizontal position aligned to the CU 410. The vertical part 422 of the L-shape is also just outside the current CTU 400 with its vertical position aligned with the CU 410. The horizontal part 421 of the L-shape may also be located far outside the current CTU but with its horizontal position aligned to the CU 410. The vertical part 422 of the L-shape may also be located far outside of the current CTU with its vertical position aligned to the CU 410.

The CU 410 is inter predicted by a MV 415 that references a reference block 430. The neighboring samples of the reference block 430 are taken from a L-shape region 440, which includes a horizontal part 441 and a vertical part 442. The L-shape region 440 has the same relative positions that correspond to the L-shape region 420 (i.e., regions 441 and 442 have same relative position from the reference block 430 as the regions 421 and 422 from the CU 410).

Figure 5:
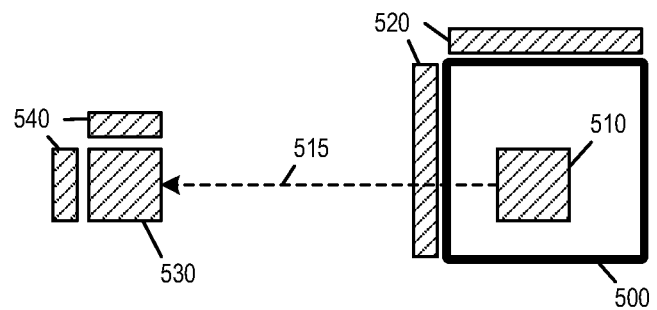
FIG. 5 illustrates a CTU whose L-shape neighbor provide the neighboring samples for a CU in the CTU during illumination compensation mode.

In some embodiments, the illumination compensation mode uses pixels in the L-shape neighboring region of the CTU to provide the neighboring samples of any CU within CTU. FIG. 5 illustrates a CTU 500 whose L-shape neighbor 520 provide the neighboring samples for a CU 510 in the CTU 500 during illumination compensation mode. As illustrated, the L-shape neighbor 520 of current CTU 500 is used to derive (based on sub-sampling or a planar-mode similar to the intra mode planar mode) an estimated L-shape neighbor for the current CU's 510. A MV 515 associated with the current CU 510 references a reference block 530, and the neighboring samples from the L-shape neighbor 540 of the reference block 530 are used to derive the illumination compensation mode parameters (scaling factor and offset of linear model) of the current CU 510.

In some embodiments, the current block is a sub-block of a larger block that comprises other sub-blocks, and the illumination compensation mode parameters computed for the current block is applicable to other sub-blocks of the larger block. For example, in some embodiments, an internal CU (a CU not touching CTU row top boundary) may use the illumination compensation mode parameters (scaling factor and offset of linear model) of a top-CU (a CU touching CTU row top boundary). In some embodiments, the illumination compensation linear model of the top-CU is inherited by other CUs in the CTU through merge mode. In some embodiments, in merge mode, the illumination compensation mode on/off flag as well as the illumination compensation mode parameters may be inherited. Moreover, the top-CU may be configured to not inherit illumination compensation mode parameters but deriving them from top-neighboring pixels of CTU row. Therefore, the top-CU may use top-neighboring pixels of the CTU row to derive accurate illumination compensation mode parameters, and the internal CU may reuse the illumination compensation mode parameters of top-CU by merge mode.

Figure 6:
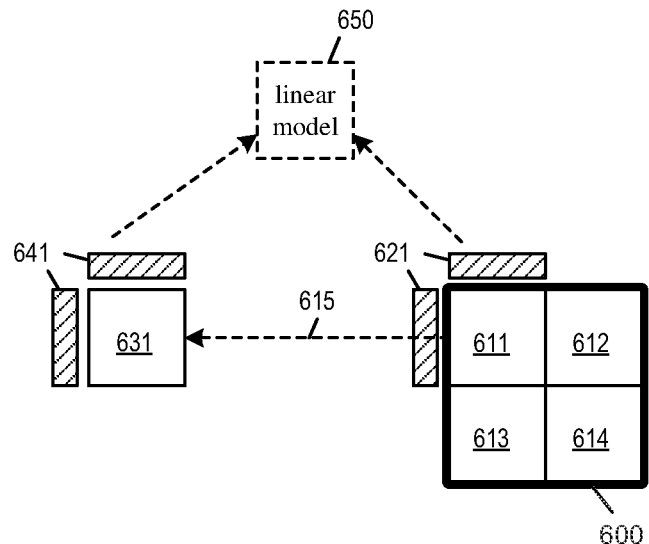
FIG. 6 illustrates a CU the illumination compensation mode parameters of which are inherited by or shared with other CUs within a CTU.

FIG. 6 illustrates a CU the illumination compensation mode parameters of which are inherited by or shared with other CUs within a CTU. The figure illustrates a CTU 600 that includes four CUs 611-614. The CU 611 is at the top-left corner of the CTU 600. In other words, the neighboring pixels immediately adjacent to the top and left of the CTU 600 also immediately adjacent to the top and the left of the CU 611.

To compute the illumination compensation mode parameters (or linear model) for the CU 611, the pixels in the L-shape region 621 are used as neighboring samples. The L-shape region 621 include neighboring pixels immediately adjacent to the top and left of the CTU 600 and the CU 611. The CU 611 is associated with a MV 615, which references a reference block 631. The pixels in a L-shape region 641 above and to the left of the reference block 631 are used as neighboring samples of the reference block 631. The neighboring samples in the L-shape region 641 and the neighboring samples in the L-shape region 621 are used to determine the illumination compensation mode parameters (or linear model) 650 for the CU 611.

The linear model 650 is used to perform illumination compensation for the CU 611. It is also used to perform illumination compensation for the CUs 612, 613, 614, even though they are not adjacent to the L-shaped region 621.

In some embodiments, the CUs 612, 613, and 614 may inherit linear model 650 from the CU 611 through merge mode, e.g., by selecting a merge candidate that corresponds to the CU 611. In some embodiments, a history buffer is used to store the illumination compensation parameters of previously coded CUs. The illumination compensation parameters of a previously coded CU may be retrieved from the History buffer (e.g., 170) and used to modify the pixels of the current block.

The methods of computing illumination compensation mode parameters described above for a CU within a CTU may be used to compute illumination compensation mode parameters for a sub-block within a larger block, and for a VPDU or a PU within a larger CU. For example, if a CU has multiple PUs and each PU has a particular size, then only the first PU of the CU (e.g., the PU at the top-left corner of the CU) uses its neighboring reconstructed samples to derive illumination compensation model parameters. Other PUs in the CU may inherent the model parameters from the first PU.

In some embodiments, if the current block is larger than or equal to a particular threshold, the current block is partitioned into multiple sub-blocks, and the illumination compensation mode is executed for each sub-block independently. For a current sub-block, if the video coder is not able to obtain both the prediction pixels and the residual pixels of the L-shaped template, the video coder may use only the prediction pixels of the L-shape template for illumination compensation mode.

IV. Illumination Compensation Based on Prediction Settings

In some embodiments, an explicit flag in a bitstream may be used to signal whether illumination compensation mode is enabled or disabled for a current block. The illumination compensation mode may also be enabled or disabled based on the position of the current CU in a CTU. The illumination compensation mode may also be enabled or disabled based on the size of the current block. For example, in some embodiments, a current CU or PU that is larger than or equal to a certain threshold has illumination compensation mode implicitly turned off.

In some embodiments, configuration settings of other tools or operations related to encoding or decoding the current block, such as those related to inter prediction or intra prediction, are used to determine whether illumination compensation is enabled or disabled for the current block. For example, the settings of other inter prediction tools for the current block, such as General Bi-prediction (GBi), Bi-directional optical flow (BIO), Sub-PU Temporal Motion Vector Prediction (SPTMVP or ATMVP), Affine mode, Bilateral Template MV Refinement (DMVR), Multi-hypothesis Intra-Merge mode, Multi-hypothesis Merge mode, Multi-hypothesis Merge+AMVP mode may be used to implicitly turn on or off illumination compensation. Examples include: BIO being turned on infers that illumination compensation mode is turned off; GBi being turn on infers that illumination compensation mode is turned off; BIO and GBI being turned on infers that illumination compensation mode is turned off; DMVR being turned on infers that illumination compensation mode is turned off; Multi-hypothesis (Intra-Merge) being turned on infers that illumination compensation mode is turned off. The configuration settings of other tools may also be used to infer the setting of the illumination compensation mode. Some combinations of the configuration settings listed above may also be used to infer the setting of the illumination compensation mode.

In some embodiments, other tools or operations related to encoding or decoding the current block are turned off when illumination compensation mode is turned on. Examples include:

BIO being turned off when illumination compensation mode is turned on; GBi being turned off when illumination compensation mode is turned on; BIO and GBI are turned off when illumination compensation mode is turned on; DMVR is turned off when illumination compensation mode is turned on; Multi-hypothesis Intra-Merge mode and DMVR are turned off when illumination compensation mode is turned on. The setting of the illumination compensation mode may also be used to turn on or off some combinations of the above mentioned tools or operations. The turning off of the other tools or operations may be implicit (without using bitstream syntax element) or explicit (using bitstream syntax elements).

For example, if illumination compensation mode is turned on (by syntax or by merge mode inheritance), the GBi may be implicitly turned off. In some embodiment, the GBI index syntax may be repurposed for AMVP if illumination compensation mode is turned on. For example, if illumination compensation mode is turned on (by syntax or by merge mode inheritance), the syntax element of Multi-hypothesis Intra-Merge may be saved and inferred to be 0.

A. Bi-Directional Optical Flow (BIO)

Bi-directional Optical Flow (BIO) utilizes the assumptions of optical flow and steady motion to achieve the sample-level motion refinement. It is applied only for truly bi-directional predicted blocks, which is predicted from two reference frames and one is the previous frame and the other is the latter frame. BIO may utilize one 5×5 window to derive the motion refinement of one sample, so for one N×N block, the motion-compensated results and corresponding gradient information of one (N+4)×(N+4) block are required to derive the sample-based motion refinement of current block. And one 6-Tap gradient filter and one 6-Tap interpolation filter are used to generate the gradient information in BIO.

B. General Bi-Prediction (GBi)

Generalized bi-prediction (GBi) is a weighted bi-prediction technique that allows using different weights for predictors from L0 and L1, respectively, instead of using equal weights. It computes the prediction signal of a block as a weighted average of two motion-compensated prediction blocks using block-level adaptive weights, where the weight values are not restricted to 0.5. The video coder may indicate a weight value for GBi by using an index to select a candidate weight from a set of candidate weights.

C. Temporal Motion Vector Prediction (SPTMVP or ATMVP)

To improve the coding efficiency, a Sub-PU Temporal Motion Vector Prediction (Sub-PU TMVP) mode is applied in the merge mode. For a Sub-PU TMVP candidate, the current PU is partitioned into many Sub-PUs, and the corresponding temporal collocated motion vectors are identified for each Sub-PU. The current PU of size M×N has (M/P)×(N/Q) sub-PUs, each sub-PU is of size P×Q, where M is divisible by P, and N is divisible by Q. An algorithm for deriving a Sub-PU TMVP is described as follows.

Step 1: for the current PU, the Sub-PU TMVP mode finds an "initial motion vector", which is denoted it as vec_init. By definition, the vec_init is the first available list of the first available spatial neighboring block. For example, if the first available spatial neighboring block has L0 and L1 MV, and LX is the first list for searching collocated information, then the vec_init uses L0 MV if LX=L0, L1 if LX=L1. The value of LX (L0 or L1) depends on which list (L0 or L1) is better for collocated information, if L0 is better for collocated information (e.g., POC distance closer than L1), then LX=L0, and vice versa. LX assignment can be slice level or picture level.

A collocated picture searching process is used to find a main collocated picture for all sub-PU in the Sub-PU TMVP mode. The main collocated picture is denoted as main_colpic. The collocated picture searching process searches the reference picture selected by the first available spatial neighboring block, and then searches all reference picture of current picture. For B-slices, the searching process starts from L0 (or L1), reference index 0, then index 1, then index 2, and so on. If the searching process finishes searching L0 (or L1), it then searches another list. For P-slices, the searching process searches the reference picture selected by the first available spatial neighboring block, and then searches all reference picture of current picture of the list starting from reference index 0, then index 1, then index 2, and so on.

For each searched picture, the collocated picture searching process performs availability checking for motion information. When performing availability checking, a scaled version of vec_init (denoted as vec_init_scaled) is added to an around-center position of the current PU. The added position is then used to check for prediction type (intra/inter) of the searched picture. The around-center position can be (i) the center pixel (PU size M*N, center=position (M/2, N/2)), (ii) the center sub-PU's center pixel, or (iii) a combination of (i) and (ii) depending on the shape of the current PU, or (iv) some other position. If the prediction type is an inter type, then the motion information is available (availability is true). If the prediction type is an intra type, then the motion information is not available (availability is false). When the searching process completes availability checking, if the motion information is available, then current searched picture is recorded as the main collocated picture. If the motion information is not available, then the searching process proceeds to search next picture.

The collocated picture searching process performs MV scaling to create the scaled version of vec_init (i.e., vec_init_scaled) when the reference picture of the vec_init is not the current reference picture. The scaled version of vec_init is created based on the temporal distances between the current picture, the reference pictures of the vec_init, and the searched reference picture.

Step 2: For each sub-PU, the Sub-PU TMVP mode further finds an initial motion vector for the sub-PU, which is denoted as vec_init_sub_i (i=0~((M/P)×(N/Q)−1)). By definition, vec_init_sub_i=vec_init_scaled.

Step 3: For each sub-PU, the Sub-PU TMVP mode finds a collocated picture for reference list 0 and a collocated picture for reference list 1. By definition, there is only one collocated picture (i.e., main_colpic) for reference list 0 and reference list 1 for all sub-PUs of the current PU.

Step 4: For each sub-PU, the Sub-PU TMVP mode finds collocated location in the collocated picture according to:

collocated location x=sub-PU_i_x+integer(vec_init_sub_i_x)+shift_x collocated location y=sub-PU_i_y+integer(vec_init_sub_i_y)+shift_y The term sub-PU_i is the current sub-PU. The term sub-PU_i_x is the horizontal left-top location of sub-PU_i inside the current picture (integer location); sub-PU_i_y is the vertical left-top location of sub-PU_i inside the current picture (integer location); vec_init_sub_i_x is the horizontal part of vec_init_sub_i (integer portion only); vec_init_sub_i_y is the vertical part of vec_init_sub_i (integer portion only); shift_x is a shift value that can be half of sub-PU width; and shift_y is a shift value that can be half of sub-PU height.

Step 5: For each sub-PU, the Sub-PU TMVP mode finds the motion information temporal predictor, which is denoted as SubPU_MI_i. The SubPU_MI_i is the motion information (MI) from collocated_picture_i_L0 and collocated_picture_i_L1 on the collocated location calculated in Step 4.

The MI of a collocated MV is defined as the set of {MV_x, MV_y, reference lists, reference index, other merge-mode-sensitive information}. The merge-mode sensitive information may include information such as local illumination compensation flag. MV_x and MV_y may be scaled according to the temporal distances between collocated picture, current picture, and reference picture of the collocated MV.

As mentioned, in some embodiments, multiple Sub-PU TMVP Candidates are added to the merge candidate list. Different algorithms are used to derive the different Sub-PU TMVP candidates. In some embodiments, N_S Sub-PU TMVP candidates are added into the candidate list, assuming there are M_C candidates in the candidate list in total, M_C>N_S. The algorithm used to derive each Sub-PU TMVP candidate i (i=1, 2, . . . , N_S) is denoted as algo_i. For different Sub-PU TMVP candidates (For example, Sub-PU TMVP candidate i and Sub-PU TMVP candidate j, i and j are different), algo_i can be different from algo_j.

D. PMVD and DMVR

Pattern-based Motion Vector Derivation (PMVD) is a method that derives a temporal motion vector predictor (MVP) from existing motion vectors (MVs) of reference frames. Similar to a block coded in skip and merge mode, a block coded by PMVD does not require motion information to be transmitted from the video encoder to the video decoder. Instead, the decoder searches the available reference frames for suitable motion vectors that can be used to reconstruct the block. PMVD is a form of frame rate up-conversion (FRUC), which allows the motion information of a block to be derived at the decoder without signaling from the encoder.

A decoder may perform PMVD by examining a set of candidate motion vectors to select an initial motion vector, and then performs decoder side motion vector refinement (DMVR) by searching around the region pointed at by the initial motion vector for a reference pixel set that has a smallest matching cost or distortion cost. The result of the search is a refined motion vector that is then used to decode the block. The decoder may perform a second stage DMVR by refining the motion vector further for each sub-block of the block.

DMVR is a technique used in video coding (encoding/decoding) to refine motion vectors for a current block of pixels without transmission of additional information (e.g., syntax elements). However, DMVR can increase the amount of computation workload and increase processing time. In some embodiments, in order to ensure that the video quality improvement by DMVR is justified by the increase of processing time, DMVR is skipped or partially performed based on certain properties or characteristics of the current block.

In some embodiments, PMVD and DMVR are used to derive and refine two motion vectors for bidirectional inter-prediction (or bi-prediction) of the current block. The current block in the present frame is coded by a first motion vector that points to a first reference pixel set in a first reference frame and a second motion vector that points to a second reference pixel set in a second reference frame. The current block is predicted by a combination of the first reference pixel set and the second reference pixel set. The PMVD and DMVR techniques are used to identify and refine the first and second motion vectors so that the distortion cost of using the combination of the first and second reference pixel sets to reconstruct the current block is minimal.

E. Multi-Hypothesis Merge Mode

The multi-hypothesis mode averages multiple merge candidate or multiple AMVP candidate or multiple inter candidate+multiple intra candidate to form the final predictor. In some important embodiments, the multi-hypothesis mode uses one merge candidate or one AMVP candidate or one inter candidate+one intra candidate to do average and form the final predictor. In some embodiments, Multi-hypothesis (Intra-Merge) is one merge candidate+one intra mode; Multi-hypothesis (Merge) is one merge candidate+one merge candidate; Multi-hypothesis (Merge+AMVP) is one merge candidate+one AMVP candidate.

V. Methods and Syntax Design for Large CTUs

The applications of larger resolution video compression become more important. In the next generation video coding, the CTU size and the maximum TU size tend to be larger than 64×64 and 32×32 respectively, for example, the CTU size can be 128×128 or 256×256, and the maximum TU size can be 64×64 or 128×128 for luma and 32×32 or 64×64 for chroma component. However, if we want to reuse the HEVC decoder structure, e.g. 32×32 or 64×64 decoder pipeline, some syntax design or encoding/decoding algorithm should be modified to support larger CTU and larger TU.

For large CTU design, if the CTU size is larger than maximum TU size, there are two partition methods. One is to split the CTU implicitly to the CUs with size equal to maximum TU size or a predefined/derived size, then explicitly signaling the CU split syntax. The other one is signaling the CU split syntax explicitly even when the CU size is larger than the maximum TU size. If the leaf CU size is larger the maximum TU size, the current CU is inferred split to more than one TUs with the size equal to maximum TU size or a predefined/derived size.

In luma/chroma separate coding, a luma CTU is coded first, then a chroma CTU is coded. If a luma CTU size is 128×128 or 256×256 and a chroma CTU size is 64×64 or 128×128, the conventional 64×64 pipeline decoder architecture (which may have a 64×64 luma texture/residual buffer and/or a 32×32 chroma texture residual buffer in each pipeline stage or each pipeline buffer) is not suitable. For example, a 128×128 luma CU can be partitioned into four 64×64 CUs implicitly and a 64×64 chroma CU can also be partitioned into four 32×32 CUs implicitly. However, in the bitstream, the four luma CU is signaled in sequential. In decoder, it cannot receive a 64×64 luma texture/residual and a 32×32 chroma texture/residual together. Therefore, the conventional 64×64 pipeline decoder architecture is not suitable or needs to be modified for luma/chroma separate coding with large CTU.

In order to reuse the conventional 64×64 (or smaller) pipeline decoder architecture, in some embodiments, the luma/chroma component related syntax (e.g. the residual, quantization level, prediction modes, coding parameters) are reordered in an interleaved mannered with in a M×N block. The M×N block can be a predefined or a derived block size, or equal to maximum TU size, or a size related to maximum/minimum TU size. In one embodiment, if the luma CTU size is 128×128 and the chroma CTU size is 64×64, and the maximum TU size for luma is 64×64 and for chroma is 32×32, and the CTU is inferred to split into four CUs, the four 64×64 luma CU and four 32×32 chroma CU is interleaved signaled. For example, a 64×64 luma CU is followed by a 32×32 chroma CU, and three pairs of {64×64 luma CU, 32×32 chroma CU} are coded after. The 64×64 luma CU and the 32×32 chroma can be further split into sub CUs. In some embodiments, the concept of luma/chroma separate coding is still applied. The 64×64 luma CU and the 32×32 chroma CU can have different coding trees.

In some embodiments, if the luma CTU size is 128×128 and the chroma CTU size is 64×64, and the maximum TU size for luma is 64×64 and for chroma is 32×32, the CU split is explicitly signaled even when the CU size is larger than the maximum TU size (e.g. signal split flag in 128×128 luma CU and 64×64 chroma CU). If the 128×128 luma CU is split into four 64×64 CUs, after coding the first 64×64 CU (the 64×64 luma CU can be further split into sub-CUs), it encodes/decodes the chroma component first. If the 64×64 chroma CU is also split into four 32×32 CUs (the 32×32 chroma CU can be further split into sub-CUs), the first 32×32 chroma CU is encoded/decoded. After encoding/decoding the first 32×32 chroma CU, the second 64×64 luma CU is encoded/decoded and the second 32×32 chroma CU, and so on. If the 128×128 luma CU is split into four 64×64 CUs but the 64×64 chroma is not split into sub-CUs (the chroma TU is inferred to four 32×32 TUs), it encodes/decodes the first 64×64 luma CU, then encodes/decodes the mode information of the 64×64 chroma CU and the first 32×32 chroma TU. After encoding/decoding the first 32×32 chroma TU, the second 64×64 luma CU is encoded/decoded and the second 32×32 chroma TU, and so on. The similar concept can be applied when the 128×128 luma CU is not split but the 64×64 chroma CU is split. It encodes/decodes the mode information of 128×128 luma CU and the first 64×64 luma TU first, then encodes/decodes the split syntax of the 64×64 chroma CU and the first 32×32 chroma CU. After encoding/decoding the first 32×32 chroma CU, the second 64×64 luma TU is encoded/decoded and the second 32×32 chroma CU, and so on. In another example, if the 128×128 luma CU and 64×64 chroma CU is not split, the split syntax and the mode information of the 128×128 luma CU is first encoded/decoded, then the first 64×64 luma TU is encoded/decoded. Then it encodes/decodes the split syntax and the mode information of the 64×64 chroma CU and the first 32×32 chroma CU. After encoding/decoding the first 32×32 chroma TU, the second 64×64 luma TU is encoded/decoded and the second 32×32 chroma TU, and so on.

In some embodiments, the split syntax of the luma CUs and chroma CUs with size larger than maximum TU size or a predefined/derived size can be first encoded/decoded. For example, the first CU split syntax of the 128×128 luma CU and the first CU split syntax of the 64×64 chroma CU can be encoded/decoded first. Then according to the CUs are split or not, the mode information and/or CU/TU syntax are encoded/decoded in an interleaved mannered. The interleaved unit can be equal to maximum TU size or a predefined/derived size.

In addition to the syntax reorder, for several specific coding tool, some embodiments provide a method to resolve the problem of processing too large CU for a certain tool for the hardware codec implementation of PU_thd size pipeline. A PU size threshold PU_thd is defined. The method can be applied to luma/chroma separated coding or luma/chroma coding tree sharing. The PU_thd can be equal to a predefined/derived size, equal to maximum TU size, or a size related to maximum/minimum TU size.

A. DMVR

A PU size threshold PU_thd is defined. There are several embodiments to resolve the problem of processing too large CU for DMVR for the codec of PU_thd size pipeline. In some embodiments, for the case that if the current PU is larger or equal to PU_thd, the DMVR mode is implicitly turned off. In some embodiments, for algorithm level, when doing DMVR, it sub-samples the current PU into the size of PU_thd. After the sub-sampling, the codec of PU_thd size pipeline can do the DMVR for sub-sampled PU. The MV refinement result by sub-sampled DMVR can be shared for each sub-PU of size PU_thd for motion compensation processing. In some embodiments, for DMVR, if the current PU is larger or equal to PU_thd, the current PU can be partitioned into M sub-PU, each of size PU_thd (so that M*PU_thd=current PU size). Then, the DMVR can be executed for each sub-PU independently.

B. LIC/NPO

There are several embodiments to resolve the problem of processing too large CU for LIC/NPO for the codec of PU_thd size pipeline. In some embodiments, for the case that if the current PU is larger or equal to PU_thd, the LIC/NPO mode is implicitly turned off. In some embodiments, for algorithm level, when doing LIC/NPO, it sub-samples the L shape template of current PU and L-shape template of reference PU into the size of PU_thd. After the sub-sampling, the weighting factor and offset factor of LIC/NPO can be calculated by the sub-sampled L-shape. Then, the weighting factor and offset factor of LIC/NPO can be shared for each sub-PU (of current PU) of size PU_thd for LIC/NPO weighted (or offset processed) motion compensation processing. In some embodiments, for LIC/NPO, if the current PU is larger or equal to PU_thd, the current PU can be partitioned into M sub-PU, each of size PU_thd (so that M*PU_thd=current PU size). Then, the LIC/NPO can be executed for each sub-PU independently. For current sub-PU, if top part or left part or both of the L-shape template of current sub-PU cannot get the "prediction+residual" pixels, it can use the "prediction" pixels for LIC/NPO algorithm.

C. FRUC/PMVD (L-Shape Template Mode)

There are several embodiments to resolve the problem of processing too large CU for FRUC (L-shape template mode) for the codec of PU_thd size pipeline. In some embodiments, for the case that if the current PU is larger or equal to PU_thd, the FRUC (L-shape template mode) mode is implicitly turned off. In some embodiments, for algorithm level, when performing FRUC (L-shape template mode), it sub-samples the L-shape template of current PU and L-shape template of reference PU into the size of PU_thd. After the sub-sampling, the MV refinement can be processed by the hardware buffer size of PU_thd. Then, the refined MV can be shared for each sub-PU (of current PU) of size PU_thd for later motion compensation processing. In some embodiments, for FRUC (L-shape template mode), if the current PU is larger or equal to PU_thd, the current PU can be partitioned into M sub-PU, each of size PU_thd (so that M*PU_thd=current PU size). Then, the FRUC (L-shape template mode) can be executed for each sub-PU independently. For current sub-PU, if top part or left part or both of the L-shape template of current sub-PU cannot get the "prediction+residual" pixels, it can use the "prediction" pixels for FRUC (L-shape template mode) algorithm.

D. FRUC (Bi-Direction Refinement Mode)

There are several embodiments to resolve the problem of processing too large CU for FRUC (bi-direction refinement mode) for the codec of PU_thd size pipeline. In some embodiments, for the case that if the current PU is larger or equal to PU_thd, the FRUC (bi-direction refinement mode) mode is implicitly turned off. In some embodiments, for algorithm level, when doing FRUC (bi-direction refinement mode), it sub-samples the current PU into the size of PU_thd. After the sub-sampling, the codec of PU_thd size pipeline can do the FRUC (bi-direction refinement mode) for sub-sampled PU for the initial PU-level MV refinement. The MV refinement result by sub-sampled FRUC (bi-direction refinement mode) can be shared for each sub-PU of size PU_thd for stage-2 refinement (4×4 refinement or K×K refinement in which K=4 or 8 or other value) and motion compensation processing. For some embodiments, for FRUC (bi-direction refinement mode), if the current PU is larger or equal to PU_thd, the current PU can be partitioned into M sub-PU, each of size PU_thd (so that M*PU_thd=current PU size). Then, the FRUC (bi-direction refinement mode) can be executed for each sub-PU independently.

E. ATMVP

There are several embodiments to resolve the problem of processing too large CU for FRUC for the codec of PU_thd size pipeline. In some embodiments, for the case that if the current PU is larger or equal to PU_thd, the ATMVP mode is implicitly turned off. In some embodiments, for algorithm level, when doing ATMVP, the current PU is sub-sampled into the size of PU_thd. After the sub-sampling, the codec of PU_thd size pipeline can do the ATMVP for sub-sampled PU. In some embodiments, for ATMVP, if the current PU is larger or equal to PU_thd, the current PU can be partitioned into M sub-PU, each of size PU_thd (so that M*PU_thd=current PU size). Then, the ATMVP can be executed for each sub-PU independently.

F. STMVP

There are several embodiments to resolve the problem of processing too large CU for STMVP for the codec of PU_thd size pipeline. In some embodiments, for the case that if the current PU is larger or equal to PU_thd, the STMVP mode is implicitly turned off In some embodiments, for STMVP, if the current PU is larger or equal to PU_thd, the current PU can be partitioned into M sub-PU, each of size PU_thd (so that M*PU_thd=current PU size). Then, the STMVP can be executed for each sub-PU independently.

G. Decoder-Side MV/Predictor Derivation

There are several embodiments to resolve the problem of processing too large CU for decoder side MV/predictor refinement/derivation tools (e.g. PMVD, BIO, decoder-side MV derivation/refinement, decoder-side intra mode derivation) for the codec of PU_thd size pipeline. In some embodiments, for the case that if the current PU is larger or equal to PU_thd, the decoder side MV/predictor refinement/derivation tool is implicitly turned off.

For decoder side MV/predictor refinement/derivation tool, if the current PU is larger or equal to PU_thd, the current PU can be partitioned into M sub-PU, each of size PU_thd (so that M*PU_thd=current PU size). Then, the decoder side MV/predictor refinement/derivation tool can be executed for each sub-PU independently. In some embodiments, for algorithm level, when doing decoder side MV/predictor refinement/derivation tool, the neighboring pixels of current PU are sub-sampled, the reference samples, and/or the current template samples into the size of PU_thd.

H. LM Mode

There are several embodiments to resolve the problem of processing too large CU for LM intra mode for the codec of PU_thd size pipeline. In some embodiments, for the case that if the current PU is larger or equal to PU_thd, the LM mode is implicitly turned off. In some embodiments, for LM mode, if the current PU is larger or equal to PU_thd, the current PU can be partitioned into M sub-PU, each of size PU_thd (so that M*PU_thd=current PU size). Then, the LM mode can be executed for each sub-PU independently. Each sub-PU will derive the required information from its corresponding luma block.

I. LM Buffer Management

If the chroma mode using the LM mode, and the chroma CU size is larger than the maximum TU size or the pipeline buffer size, the LM predictor can be generated when decoding the corresponding luma samples. For example, if a 64×64 chroma is using the LM mode, when it decodes the first corresponding 64×64 luma CU/TU, the first 32×32 LM predictor can be generated and stored in the pipeline buffer or a predictor buffer. After decoding all 64×64 luma CUs/TUs, a 64×64 chroma LM predictor is generated and can be used for sample reconstruction.

VI. Example Video Encoder

Figure 7:
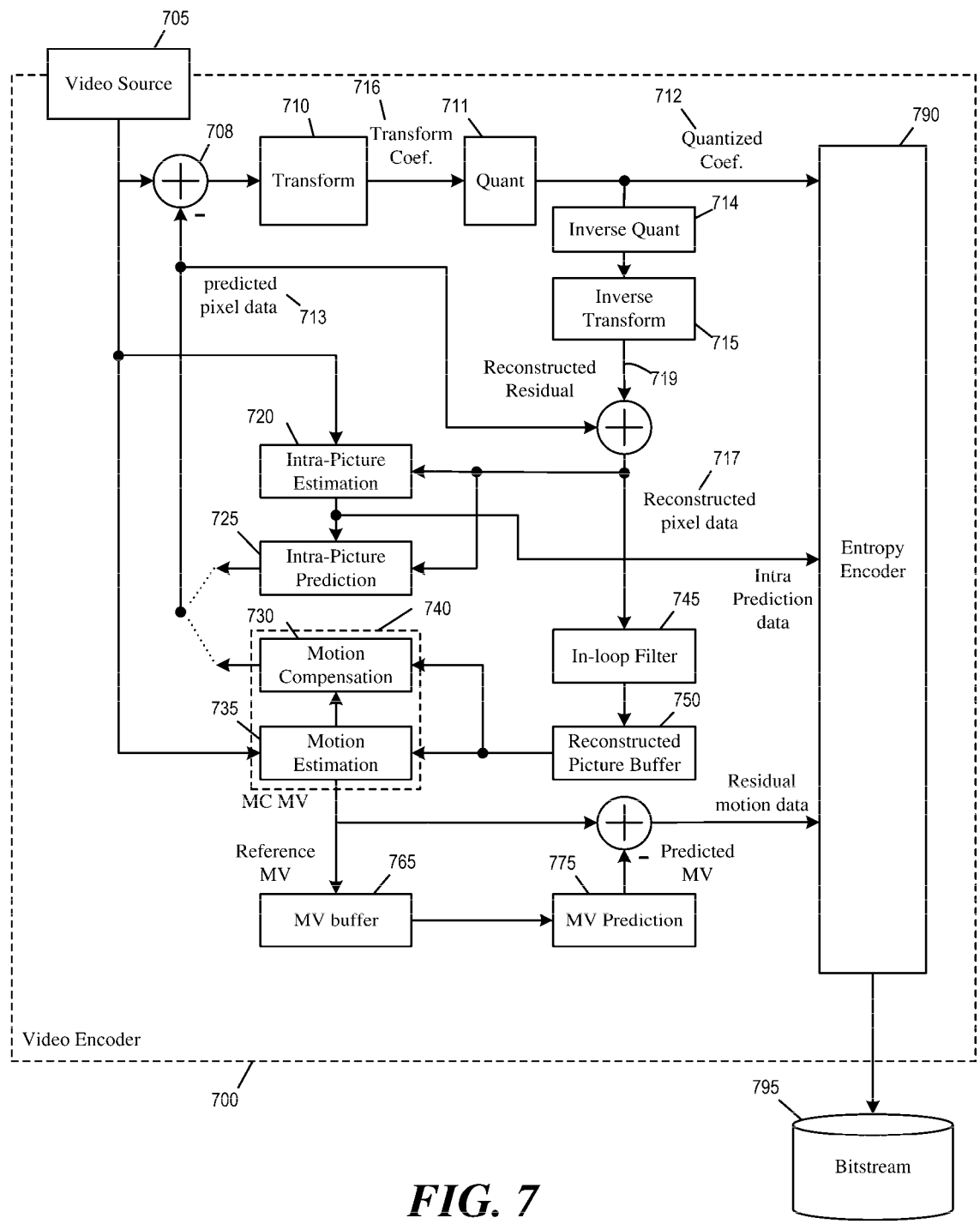
FIG. 7 illustrates an example video encoder that implements illumination compensation mode, consistent with some embodiments of the disclosure.

FIG. 7 illustrates an example video encoder 700 that implements illumination compensation mode, consistent with some embodiments of the disclosure. As illustrated, the video encoder 700 receives input video signal from a video source 705 and encodes the signal into bitstream 795. The video encoder 700 has several components or modules for encoding the signal from the video source 705, including a transform module 710, a quantization module 711, an inverse quantization module 714, an inverse transform module 715, an intra-picture estimation module 720, an intra-prediction module 725, a motion compensation module 730, a motion estimation module 735, an in-loop filter 745, a reconstructed picture buffer 750, a MV buffer 765, and a MV prediction module 775, and an entropy encoder 790. The motion compensation module 730 and the motion estimation module 735 are part of an inter-prediction module 740.

In some embodiments, the modules 710-790 are modules of software instructions being executed by one or more processing units (e.g., a processor) of a computing device or electronic apparatus. In some embodiments, the modules 710-790 are modules of hardware circuits implemented by one or more integrated circuits (ICs) of an electronic apparatus. Though the modules 710-790 are illustrated as being separate modules, some of the modules can be combined into a single module.

The video source 705 provides a raw video signal that presents pixel data of each video frame without compression. A subtractor 708 computes the difference between the raw video pixel data of the video source 705 and the predicted pixel data 713 from the motion compensation module 730 or intra-prediction module 725. The transform module 710 converts the difference (or the residual pixel data or residual signal 709) into transform coefficients (e.g., by performing Discrete Cosine Transform, or DCT). The quantization module 711 quantizes the transform coefficients into quantized data (or quantized coefficients) 712, which is encoded into the bitstream 795 by the entropy encoder 790.

The inverse quantization module 714 de-quantizes the quantized data (or quantized coefficients) 712 to obtain transform coefficients, and the inverse transform module 715 performs inverse transform on the transform coefficients to produce reconstructed residual 719. The reconstructed residual 719 is added with the predicted pixel data 713 to produce reconstructed pixel data 717. In some embodiments, the reconstructed pixel data 717 is temporarily stored in a line buffer (not illustrated) for intra-picture prediction and spatial MV prediction. The reconstructed pixels are filtered by the in-loop filter 745 and stored in the reconstructed picture buffer 750. In some embodiments, the reconstructed picture buffer 750 is a storage external to the video encoder 700. In some embodiments, the reconstructed picture buffer 750 is a storage internal to the video encoder 700.

The intra-picture estimation module 720 performs intra-prediction based on the reconstructed pixel data 717 to produce intra prediction data. The intra-prediction data is provided to the entropy encoder 790 to be encoded into bitstream 795. The intra-prediction data is also used by the intra-prediction module 725 to produce the predicted pixel data 713.

The motion estimation module 735 performs inter-prediction by producing MVs to reference pixel data of previously decoded frames stored in the reconstructed picture buffer 750. These MVs are provided to the motion compensation module 730 to produce predicted pixel data.

Instead of encoding the complete actual MVs in the bitstream, the video encoder 700 uses MV prediction to generate predicted MVs, and the difference between the MVs used for motion compensation and the predicted MVs is encoded as residual motion data and stored in the bitstream 795.

The MV prediction module 775 generates the predicted MVs based on reference MVs that were generated for encoding previously video frames, i.e., the motion compensation MVs that were used to perform motion compensation. The MV prediction module 775 retrieves reference MVs from previous video frames from the MV buffer 765. The video encoder 700 stores the MVs generated for the current video frame in the MV buffer 765 as reference MVs for generating predicted MVs.

The MV prediction module 775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 795 by the entropy encoder 790.

The entropy encoder 790 encodes various parameters and data into the bitstream 795 by using entropy-coding techniques such as context-adaptive binary arithmetic coding (CABAC) or Huffman encoding. The entropy encoder 790 encodes various header elements, flags, along with the quantized transform coefficients 712, and the residual motion data as syntax elements into the bitstream 795. The bitstream 795 is in turn stored in a storage device or transmitted to a decoder over a communications medium such as a network.

The in-loop filter 745 performs filtering or smoothing operations on the reconstructed pixel data 717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 8:
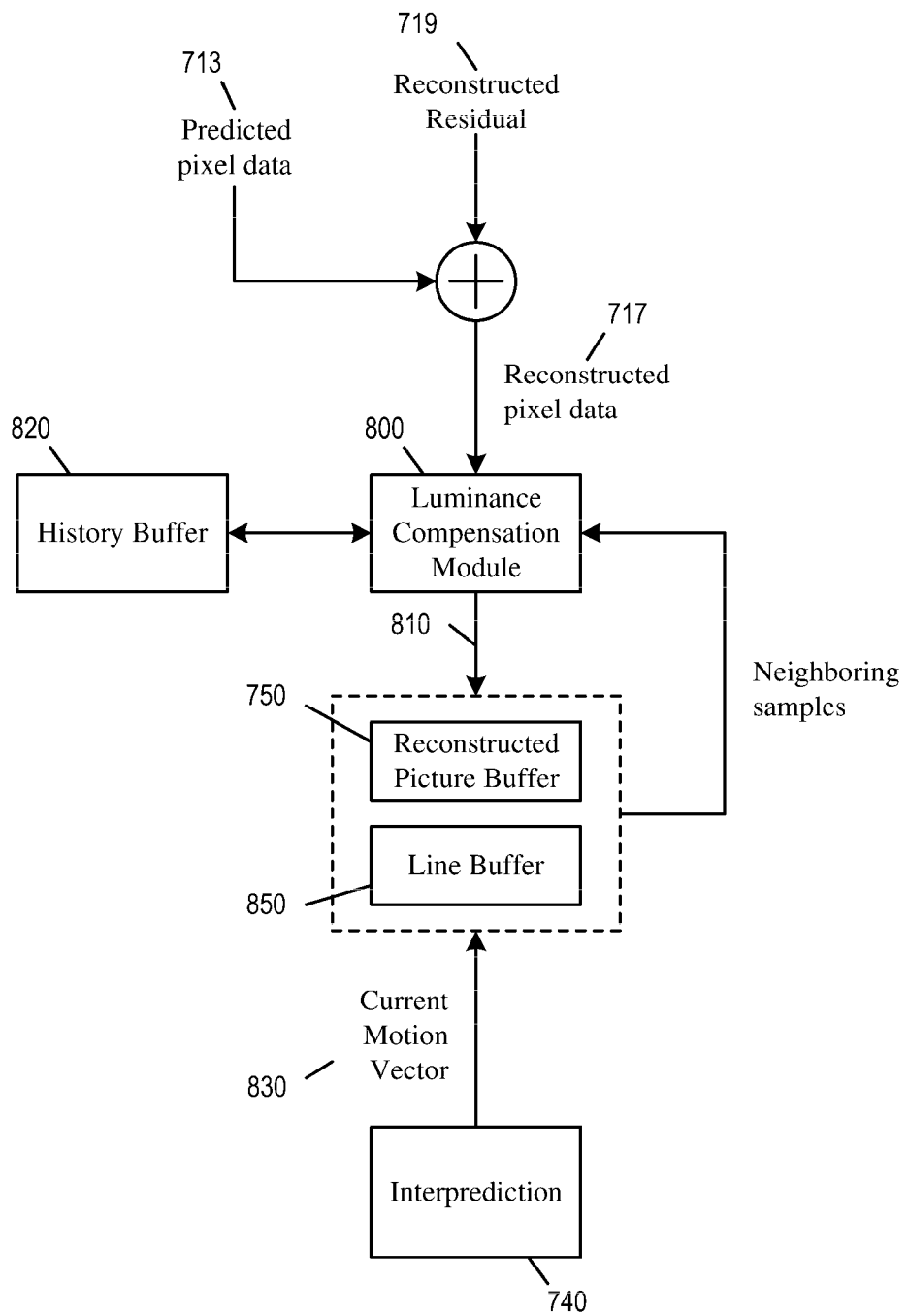
FIG. 8 illustrates portions of the video encoder that implement illumination compensation mode, consistent with some embodiments of the disclosure.

FIG. 8 illustrates portions of the video encoder 700 that implement illumination compensation mode, consistent with some embodiments of the disclosure. As illustrated, an illumination compensation module 800 receives reconstructed pixel data 717 of the current block that is the sum of the predicted pixel data 713 and the reconstructed residual 719. The reconstructed pixel data 717 are motion-compensated pixels that may not have illumination compensation performed. Based on the motion-compensated pixels 717, the illumination compensation module 800 generates modified pixel data 810 to be further processed and stored in the reconstructed picture buffer 750 and a line buffer 850. The reconstructed picture buffer 750 stores reconstructed blocks of the current frame as well as reference frames. The line buffer 850 stores the last decoded row of CTUs or CUs just above the current CTU row.

The illumination compensation module 800 applies a linear model (or a set of illumination compensation parameters) to modify the reconstructed pixel data 717 of the current block. In some embodiments, the linear model is applied to refine the predicted pixel data 713. The illumination compensation module 800 may generate the linear model based on pixel data stored in the reconstructed picture buffer 750 and/or the line buffer 850. For example, the neighboring samples of the current block may be derived from the content of the reconstructed picture buffer 750 and/or the line buffer 850, while the neighboring samples of the reference block may be derived based on the content of the reconstructed picture buffer 750. A motion vector associated with the current block may be provided by the inter prediction module 740 to locate the pixels of the reference block and of its neighboring samples from the reconstructed picture buffer 750. The illumination compensation module 800 may also retrieve the linear model from a history buffer 820, which stores linear models (or illumination compensation parameters) of the recently coded blocks.

Though not illustrated, the illumination compensation module 800 may receive configuration settings of operations applicable to the current block (e.g., GBi, BIO, DMVR, and other prediction tools), as well as the configuration settings of the current block itself (e.g., its size). In some embodiments these configuration settings are provided by the motion estimation module 735, or a rate-distortion process.

VII. Example Video Decoder

Figure 9:
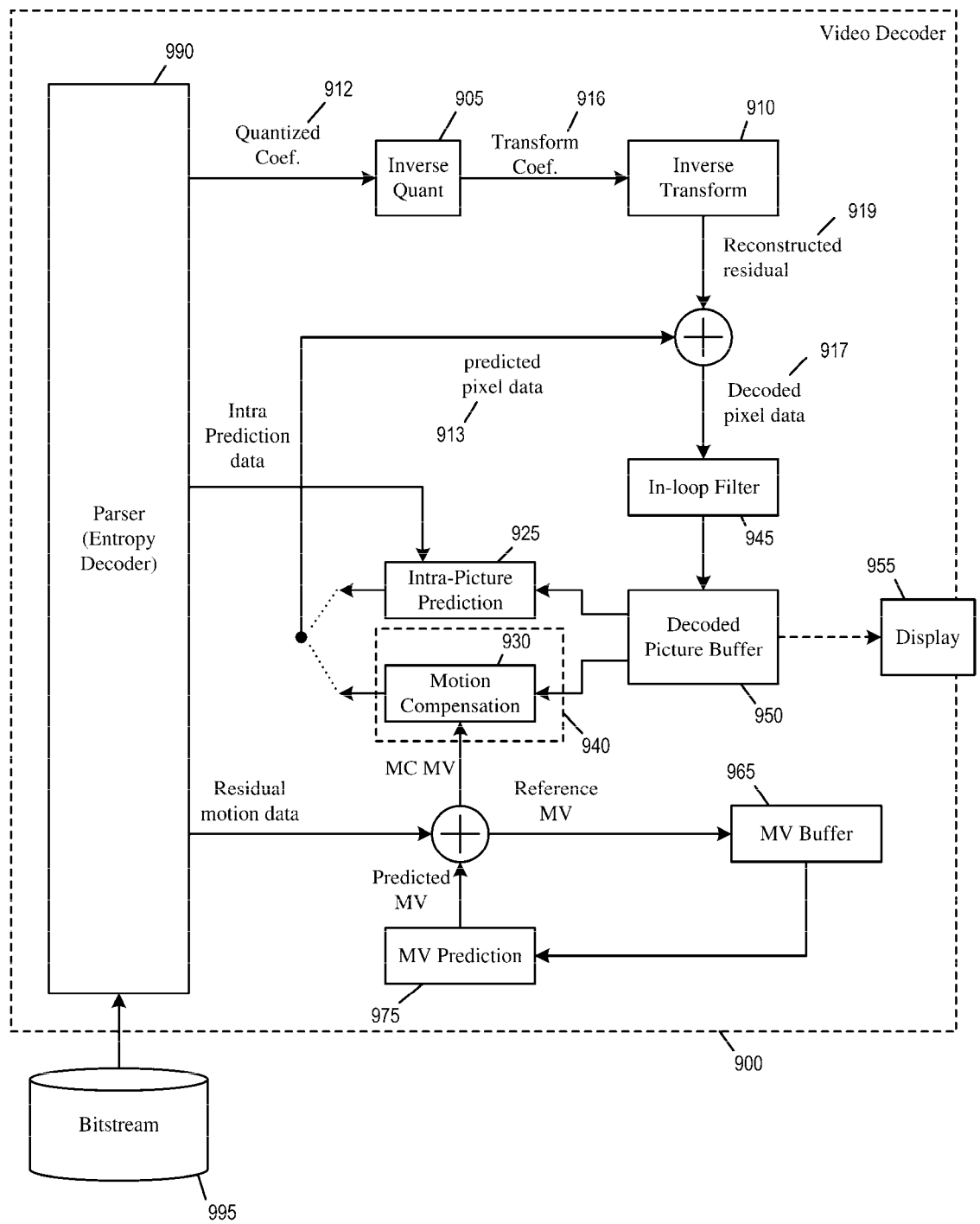
FIG. 9 illustrates an example video decoder that implements illumination compensation mode, consistent with some embodiments of the disclosure.

FIG. 9 illustrates an example video decoder 900 that implements illumination compensation mode, consistent with some embodiments of the disclosure. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including an inverse quantization module 905, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 905 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
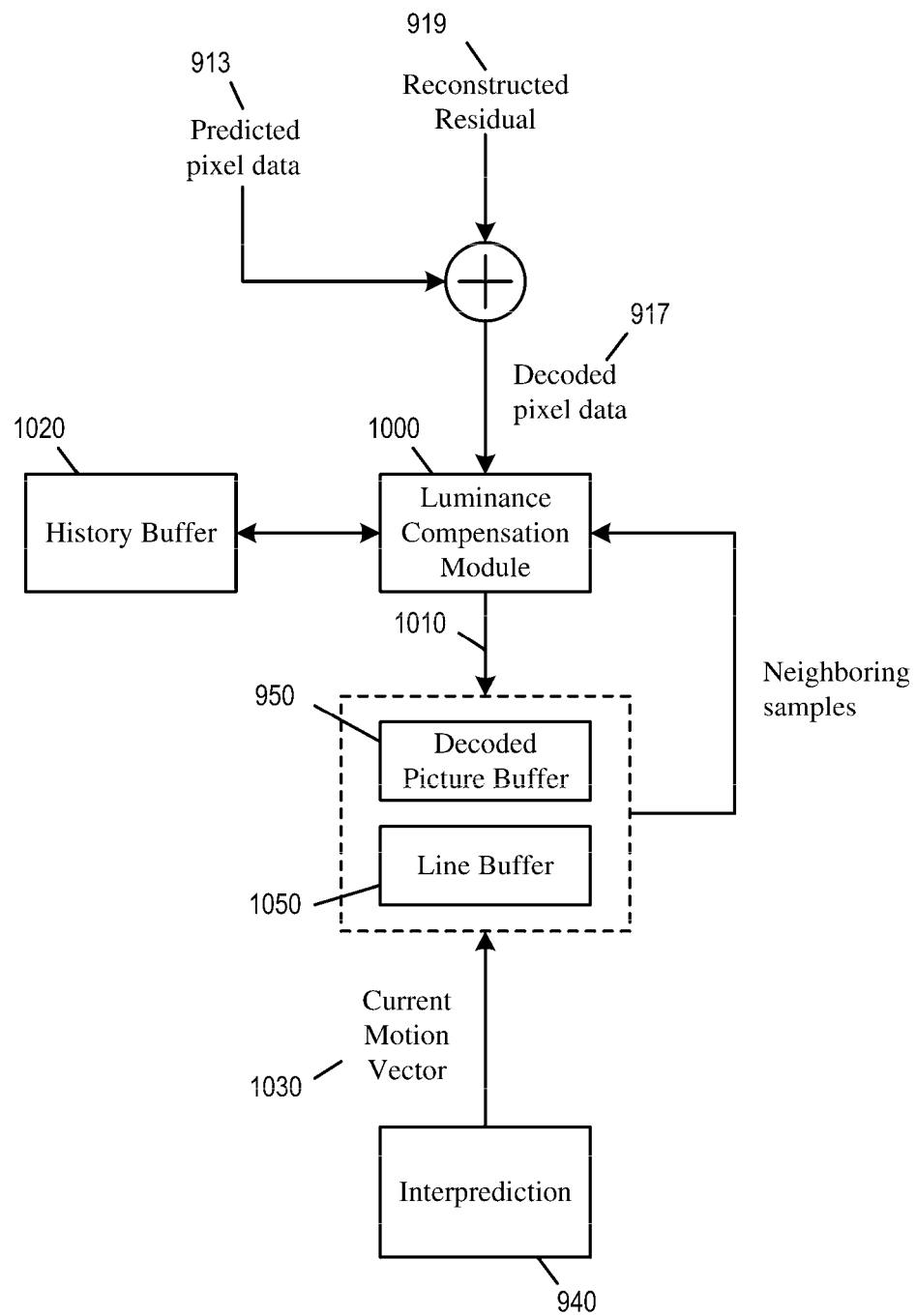
FIG. 10 illustrates portions of the video decoder that implement illumination compensation mode, consistent with some embodiments of the disclosure.

FIG. 10 illustrates portions of the video decoder 900 that implement illumination compensation mode, consistent with some embodiments of the disclosure. As illustrated, an illumination compensation module 1000 receives decoded pixel data 917 of the current block that is the sum of the predicted pixel data 913 and the reconstructed residual 919. The decoded pixel data 917 are motion-compensated pixels that may not have illumination compensation performed. Based on the motion-compensated pixels 917, the illumination compensation module 1000 generates modified pixel data 1010 to be further processed and stored in the decoded picture buffer 950 and a line buffer 1050. The decoded picture buffer 950 stores previously reconstructed blocks of the current frame as well as reference frames. The line buffer 1050 stores the last decoded row of CTUs or CUs just above the current CTU row.

The illumination compensation module 1000 applies a linear model (based on a set of illumination compensation parameters) to modify the decoded pixel data 917 of the current block. In some embodiments, the linear model is applied to refine the predicted pixel data 913. The illumination compensation module 1000 may generate the linear model based on pixel data stored in the decoded picture buffer 950 and/or the line buffer 1050. For example, the neighboring samples of the current block may be derived based on the content of the decoded picture buffer 950 and/or the line buffer 1050, while the neighboring samples of the reference block may be derived based on the content of the decoded picture buffer 950. A motion vector associated with the current block may be provided by the inter prediction module 940 to locate the pixels of the reference block and of its neighboring samples from the decoded picture buffer 950. The illumination compensation module 1000 may also retrieve the linear model from a history buffer 1020, which stores linear models (or illumination compensation parameters) of the recently coded blocks.

Though not illustrated, the illumination compensation module 1000 may receive configuration settings of operations applicable to the current block (e.g., GBi, BIO, DMVR, and other prediction tools), as well as the configuration settings of the current block itself (e.g., its size). In some embodiments, these configuration settings are provided by the parser or entropy decoder 990.

Figure 11:
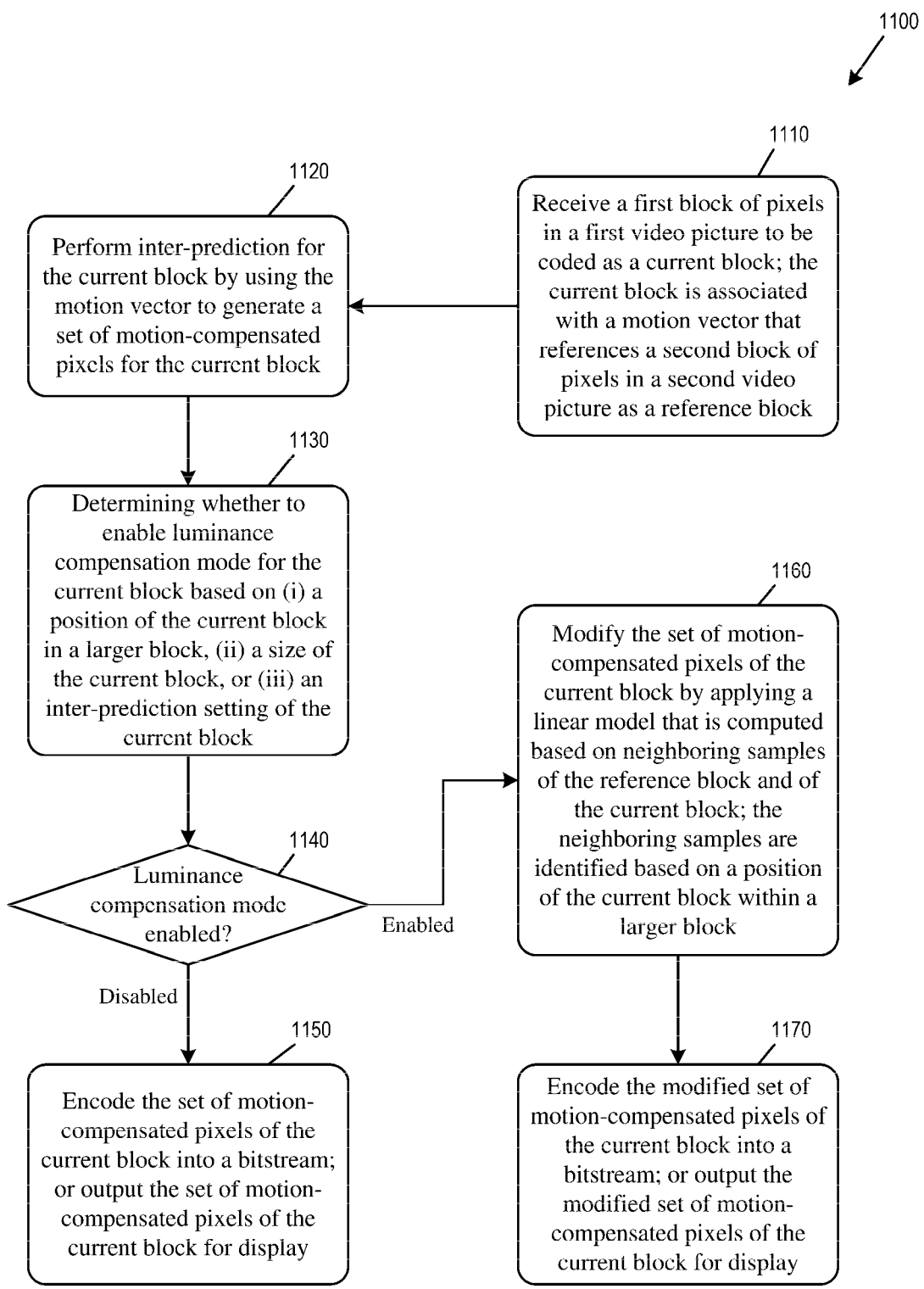
FIG. 11 conceptually illustrates a process for performing illumination compensation mode of the current block.

FIG. 11 conceptually illustrates a process 1100 for performing illumination compensation mode of the current block. In some embodiments, one or more processing units (e.g., a processor) of a computing device implementing a video coder (encoder 700 or the decoder 900) performs the process 1100 by executing instructions stored in a computer readable medium. In some embodiments, an electronic apparatus implementing the video coder performs the process 1100.

The video coder receives (at step 1110) a first block of pixels in a first video picture to be coded as a current block. The blocks of pixels are reconstructed from residuals produced by an inverse transform operation and prediction pixel produced by inter-prediction or intra-prediction. When encoding, the blocks of pixels is to be encoded in a bitstream as the current block. When decoding, the block of pixels are decoded from a bitstream as the current block. The current block is associated with a motion vector that references a second block of pixels in a second video picture as a reference block. The video coder performs (at step 1120) inter-prediction for the current block by using the motion vector to generate a set of motion-compensated pixels for the current block.

The video coder determines (at step 1130) whether to enable or disable illumination compensation mode for the current block based on (i) a position of the current block in a larger block, (ii) a size of the current block, or (iii) an inter-prediction setting of the current block. In some embodiments, the current block may be a sub-block of a larger block or a CU of a CTU. The illumination compensation mode may be disabled if the current block is not a top-most block or a left-most block of the larger block or CTU. In some embodiments, the illumination compensation mode is turned off when GBi, BIO, SPTMVP or ATMVP, Affine mode, DMVR, Multi-hypothesis Intra-Merge mode, Multi-hypothesis Merge mode, or Multi-hypothesis Merge+ AMVP mode is turned on for the current block.

The video coder determines (at step 1140) whether the illumination compensation mode is enabled or disabled. If illumination compensation mode is enabled, the process proceeds to 1160. If illumination compensation is disabled, the process proceeds to 1150.

At step 1150, the video coder encodes the set of motion-compensated pixels of the current block into a bitstream or outputs the set of motion-compensated pixels of the current block for display.

At step 1160, the video coder modifies the set of motion-compensated pixels of the current block by applying a linear model that is computed based on neighboring samples of the reference block and of the current block. The neighboring samples are identified based on a position of the current block within a larger block. The linear model is based on a set of illumination compensation parameters comprising a scaling factor and an offset for a linear model. The larger block may include multiple sub-blocks and the current block is a first sub-block. Neighboring pixels of the first sub-block are used as neighboring samples to compute the linear model that is used to modify the current block and other sub-blocks of the larger block. In some embodiments, neighboring pixels of the larger block are sub-sampled and used as the neighboring samples to compute the linear model that is used to modify the current block and other sub-blocks of the larger block.

In some embodiments, the current block may be a CU in a CTU that includes multiple CUs. The identified neighboring samples of the current block are derived based on neighboring pixels of the CTU. In some embodiments, the current block is a prediction unit (PU) and the larger block is a coding unit (CU) that includes a plurality of PUs and has a size that is greater than a threshold. The identified neighboring samples of the current block are derived based on neighboring pixels of the CU.

In some embodiments, the identified neighboring samples of the current block are neighboring pixels of the larger block that are vertically or horizontally aligned with the current block. The neighboring samples may include neighboring pixels above the larger block and no other pixels when the current block is at a top edge of the larger block but not at a left edge of the larger block. The neighboring samples may include neighboring pixels left of the larger block and no other pixels when the current block is at a left edge of the larger block but not at a top edge of the larger block.

In some embodiments, the neighboring samples are computed by using reconstructed pixels of a neighboring block based on prediction pixels and residual pixels when the residual pixels are available and by using the prediction pixels of the neighboring block when the residual pixels are not available. In some embodiments, the linear model is inherited from a neighboring block of the current block (that provide the selected merge candidate).

The video coder encodes (at step 1170) the modified set of motion-compensated pixels of the current block into a bitstream or outputs the modified set of motion-compensated pixels of the current block for display.

VIII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
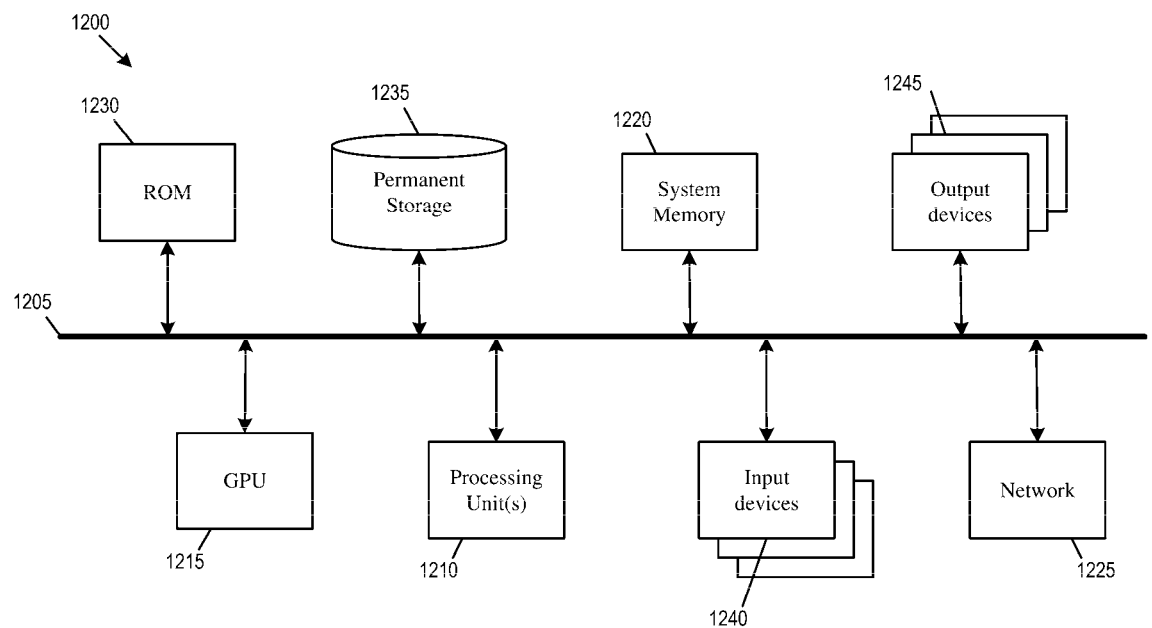
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alpha-numeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

The invention claimed is:

1. A method comprising:
receiving a first block of pixels in a first video picture to be coded as a current block, wherein the current block is associated with a motion vector that references a second block of pixels in a second video picture as a reference block;
performing inter-prediction for the current block by using the motion vector to generate a set of motion-compensated pixels for the current block; and
modifying the set of motion-compensated pixels of the current block by applying a linear model that is computed based on neighboring samples of the reference block and of the current block, wherein the neighboring samples are identified based on a position of the current block within a larger block.

2. The method of claim 1, wherein the linear model is based on a set of illumination compensation parameters comprising a scaling factor and an offset.

3. The method of claim 1, wherein the larger block comprises a plurality of sub-blocks, wherein a first sub-block is the current block, wherein neighboring pixels of the first sub-block are used as the neighboring samples of the current block to compute the linear model that is used to modify the current block and other sub-blocks of the larger block.

4. The method of claim 1, wherein the current block is a coding unit (CU) and the larger block is a coding tree unit (CTU) that includes a plurality of CUs, wherein the identified neighboring samples of the current block are derived based on neighboring pixels of the CTU.

5. The method of claim 1, wherein the current block is a prediction unit (PU) and the larger bock is a coding unit (CU) that includes a plurality of PUs and has a size that is greater than a threshold, wherein the identified neighboring samples of the current block are derived based on neighboring pixels of the CU.

6. The method of claim 1, wherein the neighboring samples of the current block are neighboring pixels of the larger block that are vertically or horizontally aligned with the current block.

7. The method of claim 1, wherein the identified neighboring samples of the current block comprises neighboring pixels above the larger block and no other pixels when the current block is at a top edge of the larger block but not at a left edge of the larger block.

8. The method of claim 1, wherein the identified neighboring samples of the current block comprises neighboring pixels left of the larger block and no other pixels when the current block is at a left edge of the larger block but not at a top edge of the larger block.

9. The method of claim 1, wherein the identified neighboring samples are computed by using reconstructed pixels based on prediction pixels and residual pixels of a neighboring block when the residual pixels of the neighboring block are available; and by using the prediction pixels of the neighboring block when the residual pixels of the neighboring block are not available.

10. The method of claim 1, wherein the linear model is inherited from a neighboring block of the current block.

11. The method of claim 1, wherein the larger block comprises a plurality of sub-blocks that includes the current block, wherein neighboring pixels of the larger block are sub-sampled and used as the neighboring samples to compute the linear model that is used to modify the current block and other sub-blocks of the larger block.

12. The method of claim 1, wherein performing inter-prediction for the current block comprises generating a set of prediction pixels for the current block, and wherein modifying the set of motion-compensated pixels of the current block comprises applying the linear model to refine the set of prediction pixels of the current block.

13. A method comprising:
receiving a first block of pixels in a first video picture to be coded as a current block, wherein the current block is associated with a motion vector that references a second block of pixels in a second video picture as a reference block;
performing inter-prediction for the current block by using the motion vector to generate a set of motion-compensated pixels for the current block;
determining whether to enable illumination compensation mode based on a prediction setting of the current block; and
modifying the current block by applying a linear model when the illumination compensation mode is enabled.

14. The method of claim 13, wherein the illumination compensation mode is disabled when a size of the current block is larger than a threshold.

15. The method of claim 13, wherein determining whether to enable the illumination compensation mode is further based on a position of the current block within a larger block.

16. The method of claim 15, wherein illumination compensation mode is disabled when the current block is not a top-most block or a left-most block of the larger block.

17. The method of claim 13, further comprising disabling the illumination compensation mode when at least one of General Bi-prediction (GBi), Bi-directional optical flow (BIO), Sub-PU Temporal Motion Vector Prediction (SPTMVP or ATMVP), Affine mode, Bilateral Template MV Refinement (DMVR), Multi-hypothesis Intra-Merge mode, Multi-hypothesis Merge mode, and Multi-hypothesis Merge+AMVP mode is turned on for the current block.

18. An electronic apparatus comprising:
an encoder circuit capable of:
receiving a first block of pixels in a first video picture to be encoded a current block, wherein the current block is associated with a motion vector that references a second block of pixels in a second video picture as a reference block;
performing inter-prediction for the current block by using the motion vector to generate a set of motion-compensated pixels for the current block;
modifying the set of motion-compensated pixels of the current block by applying a linear model that is computed based on neighboring samples of the reference block and of the current block, wherein the neighboring samples are identified based on a position of the current block within a larger block; and
encoding the modified set of motion-compensated pixels of the current block into a bitstream.

19. The electronic apparatus of claim 18, wherein the modifying is based on enablement of an illumination compensation mode.

20. The method of claim 1, wherein the modifying is based on enablement of an illumination compensation mode.

* * * * *